(12) United States Patent
Cotner et al.

(10) Patent No.: US 8,386,522 B2
(45) Date of Patent: Feb. 26, 2013

(54) TECHNIQUE TO INTRODUCE ADVANCED FUNCTIONAL BEHAVIORS IN A DATABASE MANAGEMENT SYSTEM WITHOUT INTRODUCING NEW DATA TYPES

(75) Inventors: Curt L. Cotner, Gilroy, CA (US); Balakrishna R. Iyer, San Jose, CA (US); Krishnarao G. Kulkarni, San Jose, CA (US); Robert W. Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 12/790,584

(22) Filed: May 28, 2010

(65) Prior Publication Data

US 2011/0295909 A1    Dec. 1, 2011

(51) Int. Cl.
*G06F 7/00* (2006.01)
*G06F 17/30* (2006.01)
(52) U.S. Cl. ............... 707/792; 707/802; 707/803
(58) Field of Classification Search ............ 707/792, 707/795, 802, 803
See application file for complete search history.

(56) References Cited

U.S. PATENT DOCUMENTS

| | | | | | |
|---|---|---|---|---|---|
| 6,003,022 | A | * | 12/1999 | Eberhard et al. ............... | 1/1 |
| 6,160,549 | A | * | 12/2000 | Touma et al. ............... | 715/762 |
| 6,169,993 | B1 | * | 1/2001 | Shutt et al. ............... | 717/108 |
| 6,684,215 | B1 | | 1/2004 | Saracco | |
| 7,308,457 | B1 | * | 12/2007 | Sundman et al. ............... | 1/1 |
| 7,548,912 | B2 | * | 6/2009 | Gideoni et al. ............... | 1/1 |
| 7,725,501 | B1 | * | 5/2010 | Stillman et al. ............... | 707/805 |
| 7,761,451 | B2 | * | 7/2010 | Cunningham ............... | 707/736 |
| 7,761,455 | B2 | * | 7/2010 | Shan et al. ............... | 707/752 |
| 7,797,342 | B2 | * | 9/2010 | Banks et al. ............... | 707/783 |
| 7,831,772 | B2 | * | 11/2010 | Nalawade et al. ............... | 711/119 |
| 7,996,387 | B2 | * | 8/2011 | Das et al. ............... | 707/715 |
| 2006/0053112 | A1 | | 3/2006 | Chitkara et al. | |
| 2007/0192296 | A1 | * | 8/2007 | Burger et al. ............... | 707/3 |
| 2010/0325169 | A1 | * | 12/2010 | Loh et al. ............... | 707/803 |
| 2011/0138123 | A1 | * | 6/2011 | Gurajada et al. ............... | 711/118 |

OTHER PUBLICATIONS

Brown, P., "Object Relational Database Development, A Plumber's Guide", Prentice Hall, Upper Saddle River, NJ, 2001, Chapter 4, pp. 203-269.
Stonebraker. M, et al., "Object Relational DBMSs. Tracking the next great wave", Morgan Kaufmann, San Francisco, CA, 1999, Chapter 12, pp. 163-183.
International Search Report mailed Jul. 20, 2011, International application No. PCT/EP2011/058175, International filing date May 19, 2011.

* cited by examiner

*Primary Examiner* — Merilyn Nguyen
(74) *Attorney, Agent, or Firm* — Gates & Cooper LLP

(57) ABSTRACT

A row property provides a mechanism for implementing advanced functional behavior in a relational database management system (RDBMS) without introducing new data types. A row property is part of a table definition, such that, when a table is defined in the RDBMS, at least one row property is specified for one or more associated columns of rows of the table, wherein the row property has an associated functional behavior that is predefined within the RDBMS. The columns associated with the row property are generally of existing data types supported by an RDBMS. A row property may be invoked when the RDBMS processes a language statement that references the row property. When the row property is invoked, the RDBMS executes programming logic associated with the row property, in order to perform the advanced functional behavior using data stored in the associated columns.

15 Claims, 4 Drawing Sheets

TECHNIQUE TO INTRODUCE ADVANCED FUNCTIONAL BEHAVIORS IN A DATABASE MANAGEMENT SYSTEM WITHOUT INTRODUCING NEW DATA TYPES

BACKGROUND OF THE INVENTION

1. Field of the Invention

This invention relates in general to database management systems performed by computers, and in particular, to row properties, a technique for introducing advanced functional behaviors in a database management system (DBMS) without introducing new data types.

2. Description of Related Art (Note: This application references a number of publications as indicated throughout the specification by one or more reference numbers within brackets, e.g., [x]. A list of these publications ordered according to these reference numbers can be found below in the section entitled "References." Each of these publications is incorporated by reference herein.)

As the cost of storage, processor and networking, the underpinning infrastructure elements of database management systems (DBMS) technology, decreases, the scope of problems that users expect to solve with DBMS technology continues to expand.

Many of these applications are considerably more complex than traditional business database applications, and it was the goal of object-relational technology [1], [2] to satisfy these complex applications by introducing new functionality and behaviors into relational database management systems (RDBMS) technology.

However, the success of object-relational database technology has been less than originally anticipated for several reasons:

(1) It has been a challenging programming task to build a scalable object-relational database system from scratch and make it commercially viable.

(2) The engineering cost to add object-relational features, such as new user-defined data types, in existing commercially successful RDBMS technology has proved to be more than expected.

(3) Most applications are developed in programming languages that have only basic alphanumeric data types and introducing object-relational features, such as user-defined data types into the database, requires a layer of mapping from the basic data types in the application programming language to the user-defined data types in the database. This is typically solved by a two-way conversion function, from user-defined data type to basic data type, between the application and the database layer. However, this requirement slows the adoption rate of any new user-defined data type introduced into the database, since programming languages and productivity tools generally do not provide native support for the new user-defined data type.

Consequently, introducing new functional behaviors through the introduction of new data types has been a challenge. There is a need for an alternate mechanism to introduce new behaviors in database management systems without introducing new data types.

SUMMARY OF THE INVENTION

To overcome the limitations in the prior art described above, and to overcome other limitations that will become apparent upon reading and understanding the present specification, the present invention discloses a method, apparatus, and article of manufacture for implementing row properties in a relational database management system (RDBMS) as a mechanism for implementing advanced functional behavior without introducing new data types.

In one embodiment, a row property is part of a table definition, i.e., when a table is defined in the RDBMS, at least one row property is specified for one or more associated columns of rows of the table, wherein the row property has an associated functional behavior that is predefined within the RDBMS. The columns associated with the row property are generally of existing data types supported by an RDBMS.

In one embodiment, a row property may be invoked, for example, when the RDBMS processes a language statement that references the row property. When the row property is invoked, the RDBMS executes the programming logic associated with the row property, in order to perform the advanced functional behavior using data stored in the associated columns.

These and other aspects of the present invention are described in more detail below.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The concept of row properties is a novel concept that does not exist in current RDBMS technology. Row properties act as table components, much like constraints.

Constraints restrict the domain of an attribute, for example, restricting an integer attribute to values between 1 and 10. Table constraints may restrict the data that can be stored in one or more attributes (columns) of tuples (rows) in relations (tables), which are usually defined using expressions that result in a Boolean value, indicating whether or not the data satisfies the constraint.

Similar to constraints, each row property is a named object defined over one or more columns of existing data types supported by an RDBMS. Unlike constraints, each row property implements a specific functional behavior predetermined by the RDBMS. An RDBMS might provide more than one row property, for use on the same columns or on different columns.

In providing row properties, the present invention has the following advantages:

(1) No new data types need to be defined for the RDBMS.

(2) Programming languages and environments do not need to be modified to permit applications to invoke the new functionality in the RDBMS.

(3) Existing application may be migrated in a straightforward manner and the applications greatly simplified by the new functionality offered by the RDBMS.

Hardware and Software Environment

Figure 1:
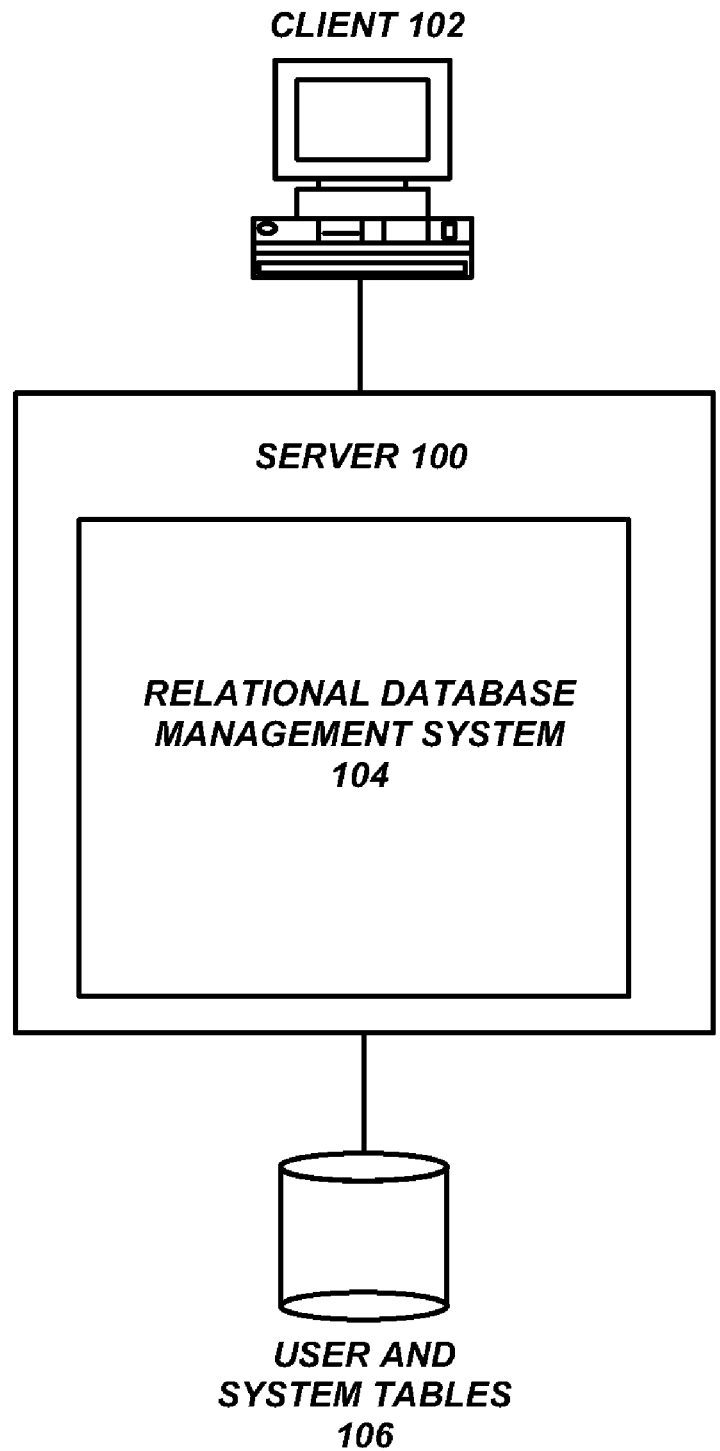
FIG. 1 illustrates an exemplary hardware and software environment according to the preferred embodiment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) 104 that manages data stored in user and system tables 106. In the preferred embodiment of the present invention, the RDBMS 104 comprises the DataBase 2 (DB2™) Universal DataBase (UDB™) product offered by IBM Corporation, although those skilled in the art will recognize that the present invention has application to any RDBMS 104.

Generally, the RDBMS 104 and tables 106 comprise logic and/or data that are embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions accessible from any computer-readable device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

RDBMS Components

Figure 2:
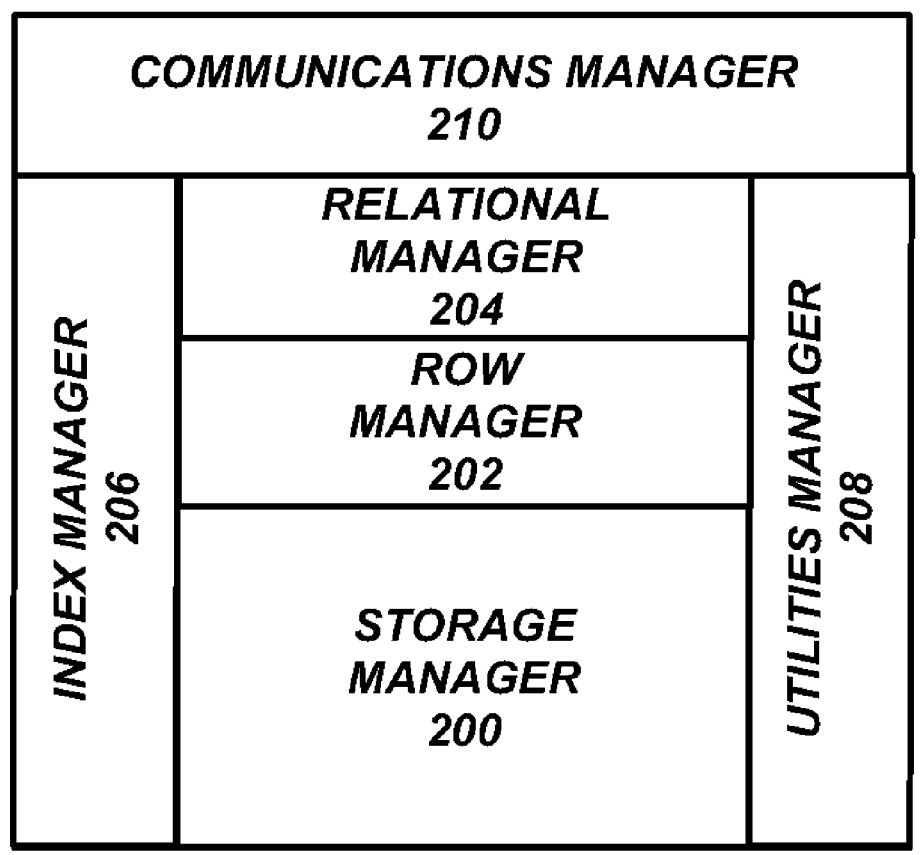
FIG. 2 illustrates the components of a relational database management system (RDBMS) according to the preferred embodiment of the present invention.

FIG. 2 illustrates an exemplary set of components of the RDBMS 104, which include: a storage manager 200, row manager 202, relational manager 204, index manager 206, utilities component 208, and communications management 210.

The storage manager 200 component is responsible for managing the storage in which data is resident. Typically, the storage manager 200 manages the storage of data in fixed sized blocks, e.g. 4 KB pages, according to various algorithms, such as a least recently used (LRU) algorithm, in an attempt to reduce input/output (10) wait times.

The row manager 202 component, sometimes called the data management component, manages the data at the record or row level, is responsible for transaction processing, and offers a limited set of relational operations on the data.

The relational manager 204 component, sometimes called the relational data system layer, implements the bulk of the relational database functions in terms of the relational operators, optimization, data type mappings, SQL processing, etc.

The index manager 206 component maintains data structures to speed up access to data.

The utilities manager 208 component performs housekeeping activities on data.

The communications manager 210 component manages interactions between the RDBMS 104 and other elements of the system or elements external to the system.

Row Properties

In the present invention, the behavior of these various components 200-210 may change based on whether a referenced table contains one or more row properties. In one embodiment, a row property may be implemented as programming logic executed within the RDBMS 104.

Thus, for a table that does not contain any row properties, regular RDBMS 104 processing is performed. Similarly, for a table that contains one or more row properties, if an SQL data definition language (DDL) or SQL data manipulation language (DML) statement processed by the RDBMS 104, or a function performed by the RDBMS 104, does not refer to a row property for that table, regular RDBMS 104 processing is performed.

It is only when an SQL DDL or SQL DML statement processed by the RDBMS 104, or a function performed by the RDBMS 104, refers to a row property, that the functionality of components 200-210 behave in a different manner. However, not all of the components 200-210 may be affected by a given row property.

As noted above, each row property is a named object defined over one or more columns of a table. Unlike constraints, however, each row property implements one or more specific functional behaviors that are predefined within the RDBMS 104. Moreover, columns participating in the definition of a row property are of existing data types supported by the RDBMS 104. Finally, the RBMS 104 might provide more than one row property, each with its own name, behavior and operators, which are predefined within the RDBMS 104.

Consequently, the following logic is performed by the RDBMS 104 when processing row properties according to the present invention:

For each component:
  If the component is executing an SQL DDL or SQL DML operation on a table with a row property,
    then
      if the component is not affected by the row property,
        then follow regular processing;
        else follow processing specific to the referenced row property;
    else
      execute regular component processing.

Figure 3:
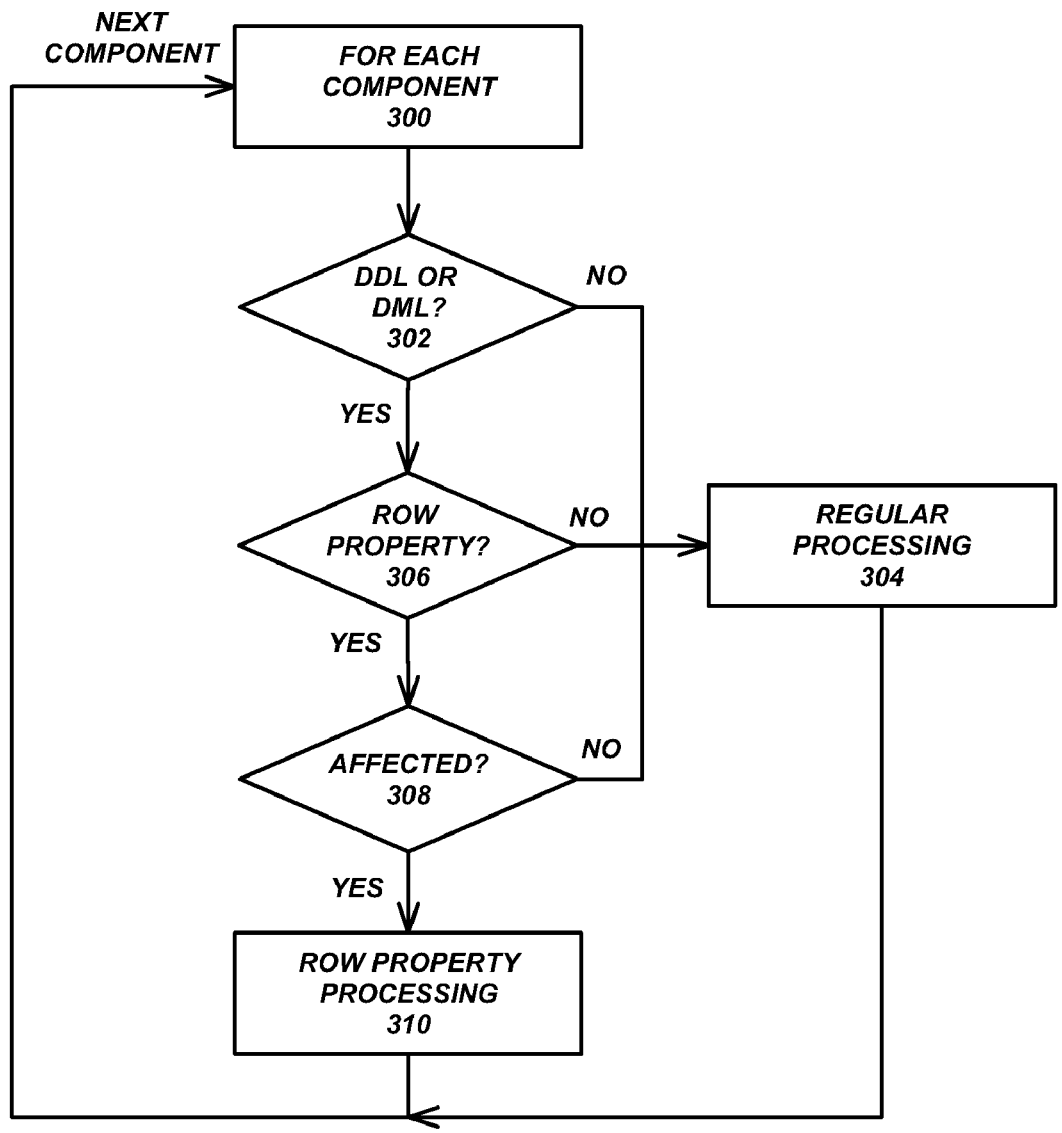
FIG. 3 is a flow chart that illustrates the logic performed by a relational database management system (RDBMS) when processing row properties according to the present invention.

Similarly, FIG. 3 is a flow chart that illustrates the logic performed by the RDBMS 104 when processing row properties according to the present invention.

Block 300 represents a loop that is performed for each component 200-210 of the RDBMS 104.

Block 302 is a decision block that determines whether the component 200-210 is executing an SQL DDL or SQL DML operation. If not, then control transfers to Block 304; otherwise, control transfers to Block 306.

Block 304 represents the component 200-210 of the RDBMS 104 performing regular processing.

Block 306 is a decision block that determines whether there is a row property on the table. If not, then control transfers to Block 304; otherwise, control transfers to Block 308.

Block 308 is a decision block that determines whether the component 200-210 is affected by the row property. If not, then control transfers to Block 304; otherwise, control transfers to Block 310.

Block 310 represents the component 200-210 of the RDBMS 104 performing processing specific to the referenced row property. Specifically, this Block represents the component 200-210 of the RDBMS 104 executing the programming logic implementing the row property.

Thereafter, control returns to Block 300 for the processing of the next component 200-210 of the RDBMS 200-210.

Example Implementation

Consider the following example where the RDBMS 104 implements a new functional behavior as a row property.

The first thing that needs to be decided is a name for the row property. Assume that the row property is designated as PROPA.

The next thing that needs to be decided is what functional behavior is associated with the row property PROPA.

Once that is decided, it needs to be determined how that functional behavior is made visible to the users. This could be in the form of SQL DDL and/or SQL DML extensions.

Finally, the modifications needed for each of the RDBMS 104 components 200-210 need to be determined to implement the functional behavior associated with that row property.

If a user wants to take advantage of the functional behavior associated with a row property, then the user needs to make use of the SQL DDL and/or SQL DML extensions associated with that property in developing an application using the RDBMS 104.

A typical DDL extension is the definition of the row property as part of a table definition. For example, the following CREATE TABLE statement illustrates this:

```
CREATE TABLE employee
(emp_id INTEGER,
 name VARCHAR(30),
 salary DECIMAL(5,2),
 dept INTEGER,
 colA INTEGER,
 colB INTEGER,
 colC INTEGER,
 colD INTEGER,
 colE INTEGER,
 colF INTEGER,
 colG INTEGER,
 CONSTRAINT dept CHECK(...),
 PROPA one_propa (colA, colB)
 PROPA two_propa (colC, colD)
 PROPB only_propb(colE,colF,colG)
);
```

The employee table created by the above statement is associated with two instantiations of the PROPA row property and one instantiation of a PROPB row property. Note that the user is expected to provide a name for each of the row property instantiations in the table, e.g., one_propa, two_propa and only_propb in the example above.

Columns participating in row property instantiations behave like any regular columns. However, the RDBMS 104 might automatically enforce one or more constraints on the values of these columns because of their inclusion in the row property instantiations. It is up to the RDBMS 104 implementer to decide on the constraints that are associated with a given row property. The RDBMS 104 implementer would have documented such implied constraints, so the user is aware of them when he/she decides to include a row property instantiation in a table definition.

In the above example, columns colA and colB are related by row property PROPA. Similarly, columns colC and colD are also related by row property PROPA, whereas columns colE, colF and colG are related by row property PROPB.

Users can refer to the name of a row property instantiation (one_propa, two_propa, and only_propb in this example) in SQL DDL and/or SQL DML statements using the syntax extensions provided by the RDBMS 104 implementer.

Users can include more than one instantiation of a row property supported by the RDBMS 104 in a table definition.

Users can also include instantiations of multiple row properties supported by the RDBMS 104 in a table definition.

The RDBMS 104 may define new operators on row property instantiations (through additional syntax) that take two or more row property instantiations and produce either a new row property instantiation or a Boolean value as the result. The RDBMS 104 transforms such operators into operations on the columns participating in the row property instantiation to produce the result.

The approach of the present invention can be compared with the approach to implement new data types to solve the same problem. When new data types are introduced, there is pervasive impact in the internals of the RDBMS 104, as compared to the approach of the present invention. Every component 200-210 dealing with data types needs to be modified to understand the new data type.

In the present invention, however, no new data type is introduced; hence, only affected components 200-210 needed to supply new behavior need to be modified. In addition, even in affected components 200-210, only portions of affected components 200-210 needed to supply the new behavior need to be modified. Introducing new behaviors generally requires significantly less programming using the present invention.

Implementation Logic

Figure 4:
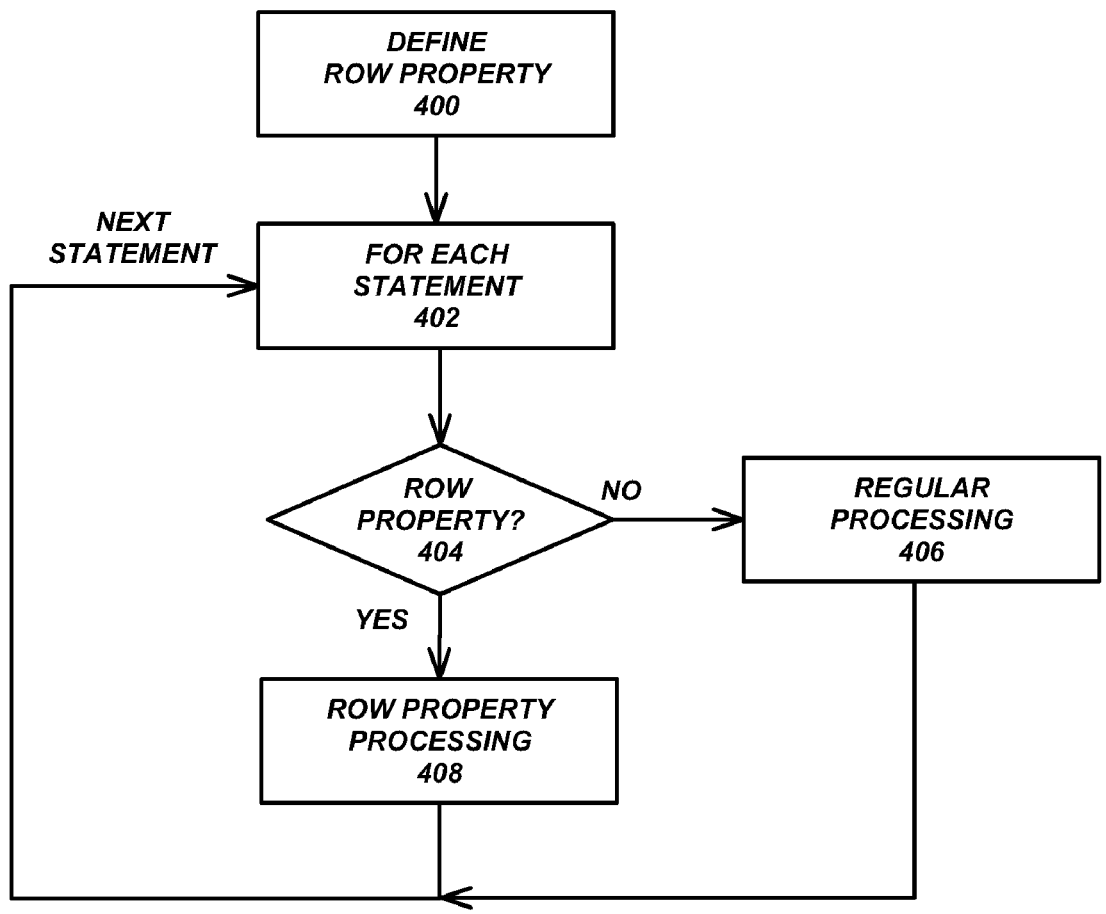
FIG. 4 is a flow chart that illustrates the logic performed by a relational database management system (RDBMS) when implementing row properties according to the present invention.

FIG. 4 is a flow chart that illustrates the logic performed by the RDBMS 104 when implementing row properties according to the present invention.

Block 400 represents the functional behavior of the row property being defined within the RDBMS 104. For example, this block may comprise the implementation of programming logic associated with the row property, wherein the programming logic, when invoked, performs the functional behavior of the row property.

Blocks 402-408 represent a loop for the processing of statements that may invoke the row property by the RDBMS 104.

Block 402 represents a loop that is performed for each statement processed by the RDBMS 104.

Block 404 is a decision block that determines whether there is a row property referenced on the statement. If not, then control transfers to Block 406; otherwise, control transfers to Block 408.

Block 406 represents the RDBMS 104 performing regular processing for the statement, because a row property is not referenced in the statement.

Block 408 represents the RDBMS 104 performing processing specific to a row property, because the row property is invoked in the statement. Specifically, this Block represents the RDBMS 104 executing the programming logic implementing the row property within the RDBMS 104.

Thereafter, control returns to Block 402 for the processing of the next statement.

REFERENCES

The following references are incorporated by reference herein:
1. Brown, P., "Object Relational Database Development, A Plumber's Guide," Prentice Hall, Upper Saddle River, N.J., 2001.
2. Stonebraker, M. and Brown, P., "Object Relational DBMSs. Tracking the next wave," Morgan Kaufmann, San Francisco, Calif., 1999.

CONCLUSION

This concludes the description of the preferred embodiment of the invention. The following describes some alternative embodiments for accomplishing the present invention.

For example, any type of computer, such as a mainframe, minicomputer, or personal computer, could be used with the present invention. Moreover, many types of databases could benefit from the present invention. In addition, any software program performing similar operations could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of implementing an advanced functional behavior in a database management system executed by a computer without introducing new data types, comprising:
   defining a row property in the database management system executed by the computer, wherein the advanced functional behavior is associated with the row property;
   modifying one or more components of the database management system executed by the computer, to implement programming logic associated with the row property that performs the advanced functional behavior;
   specifying a table definition for a table in the database management system executed by the computer, wherein the table definition associates the row property with one or more columns within rows of the table; and
   invoking the row property in the database management system executed by the computer, wherein the database management system executes the programming logic associated with the row property in order to perform the advanced functional behavior using data stored in the columns within the rows of the table.

2. The method of claim 1, wherein the programming logic associated with the row property is defined over the associated columns.

3. The method of claim 2, wherein the programming logic associated with the row property is predefined within the database management system.

4. The method of claim 1, wherein the row property is invoked in the database management system when the row property is referenced by a data definition language (DDL) or data manipulation language (DML) statement processed by the database management system, or when a function is performed in the database management system that refers to the row property.

5. The method of claim 1, wherein the associated columns are comprised of defined data types within the database management system.

6. An apparatus for implementing an advanced functional behavior in a database management system executed by a computer without introducing new data types, comprising:
   a computer having a memory and a data storage device coupled thereto, wherein the data storage device stores a data store;
   a database management system, executed by the computer, for:
      defining a row property in the database management system executed by the computer, wherein the advanced functional behavior is associated with the row property;
      modifying one or more components of the database management system executed by the computer, to implement programming logic associated with the row property that performs the advanced functional behavior;
      specifying a table definition for a table in the database management system executed by the computer, wherein the table definition associates the row property with one or more columns within rows of the table; and
      invoking the row property in the database management system executed by the computer, wherein the database management system executes the programming logic associated with the row property in order to perform the advanced functional behavior using data stored in the columns within the rows of the table.

7. The apparatus of claim 6, wherein the programming logic associated with the row property is defined over the associated columns.

8. The apparatus of claim 7, wherein the programming logic associated with the row property is predefined within the database management system.

9. The apparatus of claim 6, wherein the row property is invoked in the database management system when the row property is referenced by a data definition language (DDL) or data manipulation language (DML) statement processed by the database management system, or when a function is performed in the database management system that refers to the row property.

10. The apparatus of claim 6, wherein the associated columns are comprised of defined data types within the database management system.

11. An article of manufacture comprising a non-transitory data storage device embodying instructions that, when read and executed by a computer, result in the computer performing a method of implementing an advanced functional behavior in a database management system executed by a computer without introducing new data types, the method comprising:
   defining a row property in the database management system executed by the computer, wherein the advanced functional behavior is associated with the row property;
   modifying one or more components of the database management system executed by the computer, to implement programming logic associated with the row property that performs the advanced functional behavior;
   specifying a table definition for a table in the database management system executed by the computer, wherein the table definition associates the row property with one or more columns within rows of the table; and
   invoking the row property in the database management system executed by the computer, wherein the database management system executes the programming logic associated with the row property in order to perform the advanced functional behavior using data stored in the columns within the rows of the table.

12. The article of claim 11, wherein the programming logic associated with the row property is defined over the associated columns.

13. The article of claim 12, wherein the programming logic associated with the row property is predefined within the database management system.

14. The article of claim 11, wherein the row property is invoked in the database management system when the row property is referenced by a data definition language (DDL) or data manipulation language (DML) statement processed by the database management system, or when a function is performed in the database management system that refers to the row property.

15. The article of claim 11, wherein the associated columns are comprised of defined data types within the database management system.

* * * * *